US012338062B2

(12) United States Patent
Eberhard

(10) Patent No.: US 12,338,062 B2
(45) Date of Patent: Jun. 24, 2025

(54) BAG, SUCH AS A SHIPPING BAG, FOR USED COFFEE CAPSULES, A METHOD FOR COLLECTING AND RECYCLING USED COFFEE CAPSULES, AND USE OF THE BAG FOR COLLECTING AND SHIPPING USED COFFEE CAPSULES

(71) Applicant: Mettler Packaging LLC, Raynham, MA (US)

(72) Inventor: Patrick Eberhard, Morbach (DE)

(73) Assignee: Mettler Packaging LLC, Raynham, MA (US)

( * ) Notice: Subject to any disclaimer, the term of this patent is extended or adjusted under 35 U.S.C. 154(b) by 0 days.

(21) Appl. No.: 16/553,485

(22) Filed: Aug. 28, 2019

(65) Prior Publication Data

US 2020/0071072 A1 Mar. 5, 2020

(30) Foreign Application Priority Data

Aug. 28, 2018 (EP) .................................... 18191277

(51) Int. Cl.

*B65F 1/00* (2006.01)
*B65D 33/20* (2006.01)
*B65D 85/804* (2006.01)

(52) U.S. Cl.

CPC ............ *B65F 1/0006* (2013.01); *B65D 33/20* (2013.01); *B65D 85/8043* (2013.01)

(58) Field of Classification Search

CPC .. B65F 1/0006; B65F 2210/167; B65D 33/20; B65D 27/06

See application file for complete search history.

(56) References Cited

U.S. PATENT DOCUMENTS 4,930,906 A * 6/1990 Hemphill ........... B65D 33/1691 383/89
5,044,776 A * 9/1991 Schramer ............... B65D 33/20 383/89
6,517,243 B2 * 2/2003 Huffer .................... B65D 33/20 383/88

(Continued)

FOREIGN PATENT DOCUMENTS

CH 507 845 A 5/1971
FR 2 038 197 A1 1/1971
WO 2015/147719 A1 10/2015

OTHER PUBLICATIONS

Extended Search Report for European Application No. 18 19 1277.5 dated Jan. 17, 2019, 3 pages.

*Primary Examiner* — Derek J Battisti
(74) *Attorney, Agent, or Firm* — Seed IP Law Group LLP

(57) ABSTRACT

A bag, such as a shipping bag, has an opening edge of a front wall present below an opening edge of the rear wall, so that the rear wall forms a protruding closing flap that can be folded over onto an overlapping area. The closing area has a first adhesive strip on the inner side of the rear wall, and the front wall has a third adhesive strip on the outer side on the other side of the overlapping area with the folded-over closing area. Also disclosed is a method for collecting used aluminum coffee capsules and a method for recycling used aluminum coffee capsules. The present disclosure further relates to use of the bags of the present disclosure for collecting and shipping used aluminum coffee capsules.

17 Claims, 3 Drawing Sheets

(56) References Cited

U.S. PATENT DOCUMENTS

| | | | | |
|---|---|---|---|---|
| 7,776,418 | B2 * | 8/2010 | Dance | C09J 7/20 428/40.1 |
| 9,108,770 | B2 * | 8/2015 | Schieber | B65D 33/20 |
| 10,138,026 | B2 * | 11/2018 | Branyon | B32B 38/10 |
| 2002/0029546 | A1 | 3/2002 | Gould | |
| 2005/0031233 | A1 * | 2/2005 | Varanese | B65D 33/20 383/211 |
| 2005/0173506 | A1 * | 8/2005 | Bartlett | B65D 27/14 229/80 |
| 2005/0286818 | A1 * | 12/2005 | Soderholm | B65D 27/34 383/205 |
| 2013/0026170 | A1 * | 1/2013 | Zerfas | B65D 75/44 220/315 |
| 2016/0137374 | A1 * | 5/2016 | Brosch | B65D 75/002 383/104 |
| 2018/0148214 | A1 * | 5/2018 | Abe | B65D 5/66 |

* cited by examiner

BAG, SUCH AS A SHIPPING BAG, FOR USED COFFEE CAPSULES, A METHOD FOR COLLECTING AND RECYCLING USED COFFEE CAPSULES, AND USE OF THE BAG FOR COLLECTING AND SHIPPING USED COFFEE CAPSULES

BACKGROUND

Technical Field

The present disclosure provides a shipping bag, in some cases a plastic shipping bag, for collecting and shipping, in some cases damp waste, in some cases used coffee capsules or aluminum coffee capsules. The disclosure further provides a method for collecting, in some cases damp waste, optionally, damp waste items. The disclosure also provides a method for recycling used coffee capsules, in some cases used aluminum coffee capsules. Finally, described herein is the use of a shipping bag according to the present disclosure, in some cases a plastic shipping bag, for collecting and shipping, in some cases damp waste, in some cases used coffee capsules or aluminum coffee capsules.

Description of the Related Art

Coffee capsules are disposable products. They are used regularly in so-called portion coffee machines. In order to brew the coffee present in the capsules, the capsule in the coffee machine is partially destroyed while water heated under high pressure, or heated water vapor, is guided through the coffee powder for a specified period of time. The quantity of coffee powder in the coffee capsule is suitable for brewing a single cup of coffee. This is therefore a single-portion pack. Coffee capsules are still enjoying increasing popularity due to their ease of use. One advantage of this type of coffee preparation is also that a broad range of different coffee types are available without having to store larger quantities of the corresponding coffee types or beans for every coffee flavor. In order to be able to guarantee the freshness and integrity of the coffee powder used for this purpose, the coffee capsules used are generally produced from an aluminum body and an aluminum cover. After removal of the coffee capsule from the coffee machine, it generally contains residue water and damp coffee grounds.

When they are not used in cafés or coffee shops, for example, coffee capsules used are often disposed of in general household waste, and are thus not subject to recycling. In Germany alone, the waste created by used coffee capsules in 2014 was estimated as amounting to 4,000 to 5,000 tons. While it should be possible to include aluminum coffee capsules in the recycling process without additional effort and by way of separate collection when these aluminum capsules are used in cafés and are collected separately, this process is more difficult with aluminum capsules that the end user takes home with them. Due to the dampness and contamination with coffee residue or damp coffee grounds, they cannot be collected in the usual recycling waste without further processing, and require separate cleaning by the user. This individual cleaning is disadvantageous, not least due to the water consumption. This also means that used coffee capsules are added to in the regular household waste. Aside from a generally present plastic inner coating, as described above, the aluminum coffee capsules are essentially made entirely of aluminum and are therefore of a single type of material, as it were, and it would therefore be desirable to make used coffee capsules made of aluminum accessible for the recycling process on as large a scale as possible. No adequate solution has been provided so far.

Hence, there is a need to be able to add used coffee capsules, in some cases coffee aluminum capsules, to a recycling process in a simple, reliable manner, and to the largest possible extent.

BRIEF SUMMARY

Accordingly, the present disclosure provides a bag such as a shipping bag with an essentially closed bottom end and an opposite opening, comprising a front wall with an inner and an outer side and a rear wall with an inner and an outer side, which in the area of their side edges and bottom edges are connected to each other at least in sections directly or via side walls and/or side folds and/or a bottom fold, and wherein the opening edge of the front wall being present below the opening edge of the rear wall, so that the rear wall forms a protruding, fold-over closing area, in some cases a closing flap. In various embodiments, the closing area has an adhesive agent A, in some cases an adhesive strip A, on the inner side or on the outer side, in some cases on the inner side, of the rear wall, and/or the front wall comprises on the outer side in the overlapping area with the closing area folded over along the opening edge of the front wall, an adhesive agent A', in some cases an adhesive strip A'. In various embodiments, the front wall has an adhesive agent B, in some cases a third adhesive strip B, on the outer side beyond the overlapping area with the folded over closing area.

BRIEF DESCRIPTION OF THE DRAWINGS

Further features and advantages of the present disclosure are indicated by the following description, in which exemplary embodiments of the present disclosure are explained by way of example using schematic drawings, without thereby restricting the present disclosure. These schematic drawings show as follows.

DETAILED DESCRIPTION

Figure 1:
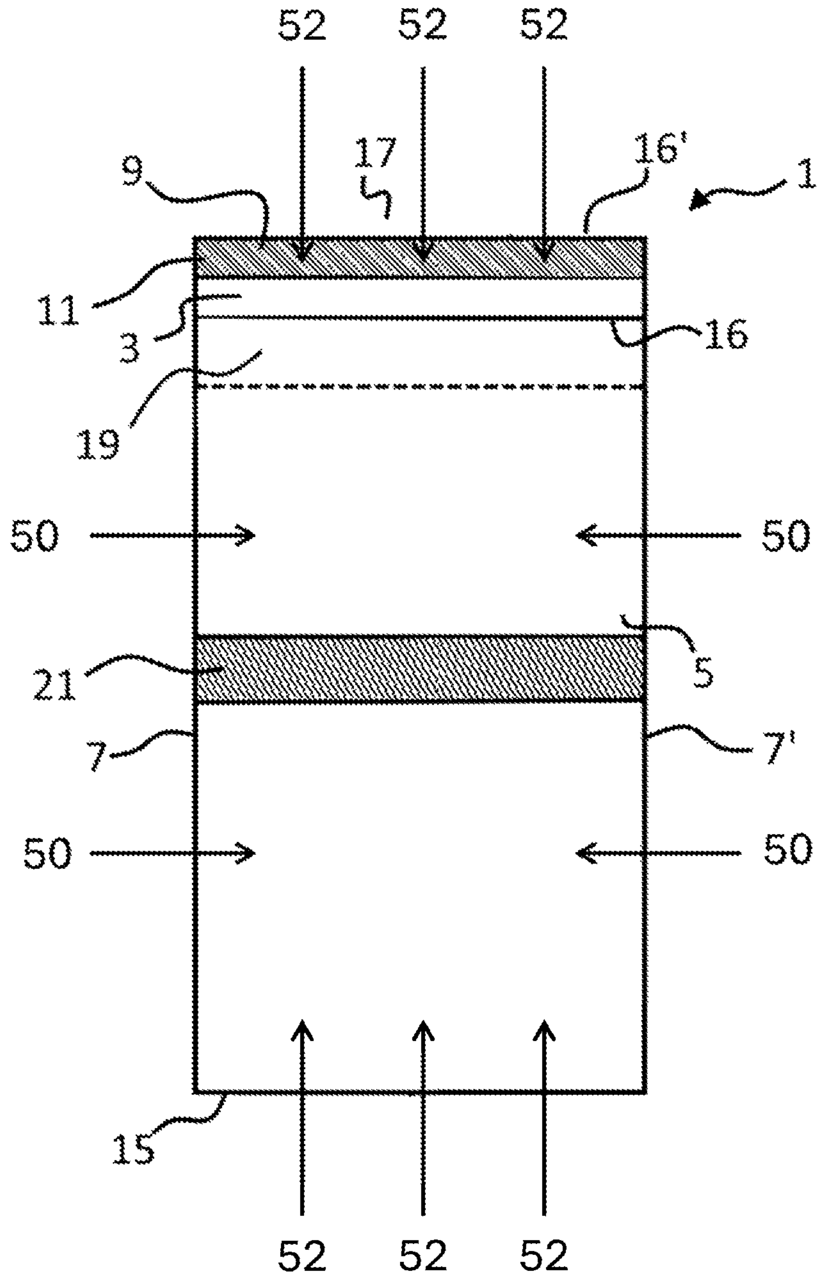
FIG. 1 is a schematic top view of an embodiment of a shipping bag according of the present disclosure.

The bag, such as a shipping bag, of the present disclosure is closable such that water residues, damp coffee grounds residues, and/or damp coffee grounds therein cannot leak out of the bag via the original filling opening during storage and transportation. Accordingly, in one advantageous embodiment, the bags of the present disclosure are produced in such a manner that water or damp material cannot leak out, either through the wall materials on the front and rear wall, or through the side walls, if present, or through the connection sections or seams of the respective interconnected wall sections. The exit of damp material or residual water or damp coffee grounds from the original filling opening can surprisingly already be achieved with the bags of the present disclosure in that in the closing area provides an adhesive agent A or A' for closing the bag in the overlapping area and that in addition, beyond of the overlapping area, an adhesive agent B is provided on the front side, so that following folding over, in some cases multiple folding over, of the closed closing area, renewed adhesion of this folded-over closing area occurs with the adhesive agent B. With the bags of the present disclosure, both coffee capsules which still contain the complete damp coffee grounds as well as those in which these damp coffee grounds have been removed through simple tipping out, for example, after tearing open the aluminum foil, so that only damp coffee grounds residues are to be found there, can be collected and transported in a damp-protected or damp-proof manner.

The bags of the present disclosure can, according to at least one embodiment, be made ready for shipping in a simple manner. The materials forming the bags of the present disclosure are in one embodiment made of a flexible material and are accordingly deformable. It is therefore assumed with the additional embodiments that the description relates to an unfilled, non-deformed state of the bag of the present disclosure, wherein said bag such as shipping bag, should essentially be regarded as extended flat. In this form, the bag of the present disclosure is also advantageously provided before filling with damp waste, in some cases used coffee capsules. The use of the term "front wall" and "rear wall" has been selected for the purpose of easier comprehension. Of course, the bag wall of which the opening edge ends above the opening edge of the opposite wall can, when actually being used, also be designed in the sense of a front wall and can have the main product designation and/or logos, for example, while the opposite wall contains no imprint.

In at least one embodiment, the shipping bag of the present disclosure is characterized in that the adhesive agent A or A', in some cases adhesive strip A or A', essentially extends from the one side edge of the rear wall essentially through to the opposite side edge of the rear wall, in some cases continuously. In a further embodiment the adhesive agent B, in some cases adhesive strip B, can additionally essentially extend from the one side edge of the front wall essentially through to the opposite side edge of the front wall, in some cases continuously. As a result of the measures described above, damp-proof bags according to the present disclosure are obtained, which in a highly reliable manner are suitable for dry transportation of damp waste collected with the bags of the present disclosure, in some cases of used coffee capsules.

In another embodiment, it is provided that the adhesive agent A or A', in some cases adhesive strip A or A', run essentially parallel to the edge on the opening side of the front wall and/or of the rear wall of the bag, in some cases of the front wall. Alternatively or in addition, here, the adhesive agent B, in some cases adhesive strip B, can run parallel to the edge on the opening side of the front wall and/or of the rear wall of the bag, in some cases of the front wall. With the arrangement of the adhesive agent or adhesive strip described above, in general, a highly efficient, reliable production of the bag according to the present disclosure is achieved.

The adhesive agent B and in some cases the adhesive strip B optionally is present in a section on the outer side of the front wall beyond the overlapping area and this side of the lower third, in some cases on the half of the front wall or this side on the half of the front wall. As a result, above all, a multiple folding over of the closed closing area can also be ensured. In some cases, such an embodiment of the bag according to the present disclosure contributes to this in which the adhesive agent B, in some cases the third adhesive strip B, is present at a distance on the outer side of the front wall on the other side of the overlapping area, which is designed and installed in order to fold over the folded and closed closing area, in some cases a closing flap, at least one, two, three or four times, in some cases at least two or at least three times, before this folded over closing area comes into contact with and can be adhered or is adhered with the adhesive agent B, in some cases an adhesive strip B.

Optionally the adhesive agent A, in some cases the adhesive strip A, is essentially attached directly on the upper opening edge of the rear wall. In this manner, a sufficient closing area can be created in a highly space-saving manner.

In another embodiment, the adhesive agent A or A', in some cases the adhesive strip A or A', ends at a distance, in some other cases a maximum 20 mm, and in some further cases a maximum 10 mm, from the one side edge and/or at a distance, in some cases a maximum 20 mm and in some further cases a maximum 10 mm, from the opposite side edge of the rear wall. Alternatively or in addition, the adhesive agent B, in some cases the adhesive strip B, can end at a distance, in some cases a maximum 20 mm, and in some further cases a maximum 10 mm, from the one side edge and/or at a distance, in some cases maximum a 20 mm and in some further cases a maximum 10 mm, from the opposite side edge of the front wall. In this manner, too, in some cases liquid-tight bags are already obtained, which can be used for dry transportation of damp waste, in some cases used coffee capsules. Further, it can be provided that the adhesive agent B, in some cases the adhesive strip B, extends, in some cases continuously, from the one side edge to the opposite side edge of the front wall.

The bags of the present disclosure also include those that have the first and/or second side wall elements between the opposite side edges of the front and rear wall. Here, the side wall elements can also be or contain side folds, which in some cases extend from the bottom end of the front and rear wall.

The front wall and the rear wall, and in some cases also the side walls, of the bag of the present disclosure such as a shipping bag, comprise or are made of polyolefins, in some cases polyethylene and/or polyesters. In another embodiment, the bags of the present disclosure can also be made of a paper material, in some cases a laminated or hydrophobic paper material.

In an advantageous embodiment, the bags of the present disclosure are essentially configured in one piece. This can be achieved, for example, by folding over the foil strip of the bottom end to form a fold. Then, only the side edges of the front and rear wall that are in contact with each other are adhered or welded to each other. Alternatively, it is of course also possible to fold-over the foil strip along a side wall. In this case, the respective remaining side wall of the front and rear wall and the edges on the bottom end that are in contact with each other would have to be adhered or welded to each other.

In general, the bag of the present disclosure can be designed in many ways in order to consistently attain the benefits of the present disclosure. For example, such bags are also suitable in which the transverse expansion of the rear wall and of the front wall, measured from the one side edge to the opposite side edge of the bag, is smaller than the longitudinal expansion of the front wall or of the rear wall, measured from the bottom end to the opening end. Alternatively, it can be provided that the transverse expansion of the rear wall and of the front wall, measured from the one side edge to the opposite side edge of the bag, is larger than the longitudinal expansion of the front wall or of the rear wall, measured from the bottom end to the opening end.

Additionally, recourse can be made to such bags of the present disclosure in which the longitudinal expansion of the rear wall, measured from the bottom end to the opening end, is greater than the longitudinal expansion of the front wall, measured from the bottom end to the opening end.

In order to achieve bags of the present disclosure with a greater transportation volume, alternatively or in addition to the provision of side walls and side folds, a bottom fold can be disposed between the bottom edges of the front and rear wall.

In an advantageous embodiment, the adhesive agents A and/or A' and/or B, in some cases the adhesive strips A and/or A' and/or B, comprise or are double-sided adhesive agents, in some cases double-sided adhesive strips. Here, it can also be provided that at least one, in some cases each, of the adhesive agents A and/or A' and/or B, in some cases the adhesive strips A and/or A' and/or B, comprises at least one detachable protective foil, wherein the protective foil can prevent a connection between the front wall and the rear wall.

A high degree of humidity and/or transport safety can also be achieved by designing the front wall and/or the rear wall and optionally the side walls, in some cases the front wall and the rear wall, with multiple layers, such as with two or three layers, for example, in the form of an in some cases dual or multi-layered bubble wrap foil.

In at least one embodiment, the front wall has a first outer layer, essentially consisting or comprising at least one polymer material, in some cases polyethylene, and an opposite first inner layer, essentially consisting of or comprising at least one polymer material, in some cases polyethylene, and in which the rear wall has a second outer layer, essentially consisting of or comprising at least one polymer material, in some cases polyethylene, and an opposite second inner layer, essentially consisting of or comprising at least one polymer material, in some cases polyethylene. In at least one embodiment, between the first outer layer and the first inner layer, numerous first hollow spaces are present that are separated from each other, through first walls, in some cases essentially consisting of or comprising at least one polymer material, in some cases polyethylene, and between the second outer layer and the second inner layer, second hollow spaces are present that are separated from each other, through second walls, in some cases essentially consisting of or comprising at least one polymer material, in some cases polyethylene. In an advantageous embodiment, the first hollow spaces parallel to the first outer layer and the second hollow spaces parallel to the second outer layer have at least one profile respectively, in which the walls of the hollow spaces respectively describe an oval shape, in some cases a circular shape.

The above embodiment of a bag of the present disclosure is also characterized in at least one embodiment in that the hollow spaces have a middle longitudinal extension and, in some cases orthogonally to it, a middle transverse extension, wherein the middle longitudinal extension is larger than the middle transverse extension, and wherein the middle longitudinal extension is a maximum of five times the middle transverse extension. Here, the middle longitudinal extension is, in some cases, in a range of 0.01 mm to 50 mm, in some other cases in the range of 0.1 to 25 mm, and in some further cases in the range from 3 to 15 mm. Alternatively or in addition, the middle transverse extension is, in some cases, in a range of 0.005 mm to 30 mm, in some other cases in the range of 0.5 to 10 mm, and in some further cases in the range from 1 to 5 mm.

Figure 3:
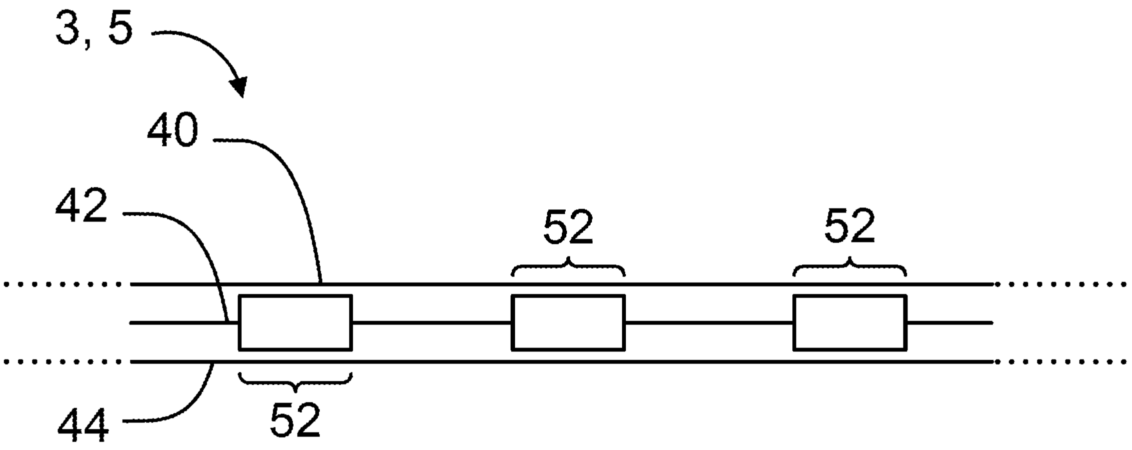
FIG. 3 is a schematic side view of an embodiment of a shipping bag according to the present disclosure.

In another embodiment of a multi-layered bag of the present disclosure, it is provided that the front wall and/or the rear wall have at least three layers 40, 42, 44, e.g., as illustrated in FIG. 3, wherein the at least three-layered front wall and/or the at least three-layered rear wall comprise a first layer (inner layer) 40, at least one second layer (interim layer) 42, and a third layer (outer layer) 44, wherein the first layer 40 faces towards the interior of the bag in relation to the second layer 42 and/or forms the inner side. The at least one second layer 42 is disposed between the first layer 40 and the third layer 44 and consists of or comprises a plastic layer, in some cases polyolefin foil. The third layer 44 faces towards the outer side of the bag in relation to the second layer 42 and/or forms the outer side. The at least one second layer 42 has a plurality of strip-shaped, longitudinal areas 52 that are piled or folded, such as strips, that run at a distance from each other. The at least one second layer 42 is connected to the first layer 40 and/or the third layer 44 by way of weld and/or adhesion seams 50 (see FIG. 1), which run transverse, in some cases essentially orthogonally, to the piled or folded strip-shaped longitudinal areas 52.

For the embodiment of the bag of the present disclosure described above, it is, in at least some embodiments, provided that the first layer (inner layer) of the front and/or rear wall, in some cases the first and second layer of the front and/or rear wall, respectively comprise or consist of at least one plastic foil, in some cases a polyolefin foil, and/or that the third layer (outer layer) of the front and/or rear wall comprises or consists of at least one plastic foil, in some cases a polyolefin foil.

With the embodiment described above, those bags of the present disclosure are suited in which the front wall and the rear wall are at least three-layered and respectively comprise the first, second, and third layer, wherein in some cases, the first and second layer and if appropriate also the third layer of the front or rear wall respectively comprise or consist of at least one plastic foil, in some cases a polyethylene foil.

Here, as an alternative or additionally, it can be provided that in profile, the piled strip-shaped longitudinal areas 52 in cross-section are areas of the second layer 42, in some cases essentially groove-shaped protrusions, comprising an opening and a depression, or that in profile, the folded, strip-shaped longitudinal areas 52 in cross-section are essentially Z-shaped folds of areas of the second layer 42. With some further embodiments, it is provided that the depression of the protrusions of the piled strip-shaped longitudinal areas 52 faces towards the first layer 40, and that the opening of the piled strip-shaped longitudinal areas 52 faces towards the third layer 44.

The bags of the present disclosure are in some cases a shipping bag, in some other cases a liquid-tight shipping bag, for waste, in some cases damp waste, and in some further cases waste items. These damp waste items are in some cases used coffee capsules, such as used aluminum coffee capsules.

With the present disclosure comes the surprising finding that bags, such as shipping bags, can be obtained in a relatively practical manner, which can be simply and reliably closed in a liquid-tight manner such that they can be used for collecting and transporting damp waste, in some cases used coffee capsules such as used aluminum coffee capsules. In addition, it has surprisingly been shown that with the bags, in some cases shipping bags, of the present disclosure, highly efficient metal recycling is possible. In at least one embodiment, it is provided that the quantity of bag material in relation to the quantity of recyclable metal is negligible, so that it does not interfere with the melting process and must not be separated in advance. Here, the bags can therefore be added to the metal molten together with the used aluminum coffee capsules contained therein.

The present disclosure further provides a method for collecting waste, in some cases damp waste, and in some further cases waste items, comprising the steps of:

a) providing at least one bag of the present disclosure,
b) filling the bag with waste, in some cases damp waste, via the bag opening,
c) folding over the closing area, in some cases the closing flap, onto the outer side of the front wall,
d) adhering the closing area using the adhesive agent A or A', in some cases adhesive strip A or A', with the outer side of the front wall,
e) multiple folding-over or rolling in of the adhered closing area until at least the adhesive agent B, in some cases adhesive strip B, is reached, and
f) adhering the adhered closing area that has been turned over multiple times or rolled in with the adhesive agent B.

In an advantageous embodiment, it can be provided that the closing area, in some cases the closing flap, is folded over at the height of the opening edge of the front wall onto the outer side of the front wall, and then adhered there. Here, in order to adhere the adhered closing area that has been turned over multiple times or rolled in, with the adhesive agent B, this third adhesive agent B, in some cases adhesive strip B, in an advantageous embodiment essentially extends from the one side edge of the front wall to the opposite side edge of the front wall, in some cases continuously. For many applications, it has however been shown to be advantageous that not only the adhesive agent A or A', in some cases the adhesive strip A or A', ends at a distance, in some cases a maximum 20 mm and in some other cases a maximum 10 mm from the one side edge and/or at a distance, in some cases a maximum 20 mm and in some other cases a maximum 10 mm from the opposite side edge of the rear wall, but that also, the adhesive agent B, in some cases the adhesive strip B, ends at a distance, in some cases a maximum 20 mm and in some other cases a maximum 10 mm from the one side edge and/or at a distance, in some cases a maximum 20 mm and some other cases a maximum 10 mm from the opposite side edge of the front wall. In this manner, the protective foils or protective strips can be attached to the adhesive agents or adhesive strips A and/or A' and/or B, which protrude at the side over these adhesive agent or adhesive strip areas and which are thus not connected to them, although they do not protrude over the side edge or side edges and end flush, for example, with these side edges. In this manner, the protective foil or the protective strip can be easily grasped and removed from the adhesive agent or adhesive strip A and/or A' and/or B.

Furthermore, with the method of the present disclosure, it can very reliably be achieved that the damp waste, in some cases the used coffee capsules, are in the section of the bag that has not been folded over or rolled in. In this manner, a highly reliable, complete closure of the bag of the present disclosure can be ensured.

With the method of the present disclosure, the bags of the present disclosure are, in some cases, filled with used coffee capsules, such as used aluminum coffee capsules.

In a further development of the method of the present disclosure, this also comprises the shipping of the bag that is closed, e.g., according to step f) above, to a collecting point.

Additionally, the present disclosure includes a method for recycling used coffee capsules, comprising:

i) collecting a plurality of bags for filling with the method according to the present disclosure as described above, such as shipping bags, with bags filled with used aluminum coffee capsules,
ii) subjecting the plurality of collected bags containing used aluminum coffee capsules to a melting process,
iii) isolating the molten aluminum, and
iv) solidification of the isolated, molten aluminum.

Here, in at least one advantageous embodiment, the used aluminum coffee capsules are subject to the melting process together with the bag.

Finally, with the present disclosure, the use of the bag of the present disclosure for collecting waste, in some cases damp waste, and in some cases used aluminum coffee capsules, was found. The use of the bags of the present disclosure for the shipping of waste, in some cases damp waste, and in some cases used aluminum coffee capsules, to a collecting point for this waste, was also found.

In FIG. 1, a shipping bag 1 of the present disclosure is shown with a bottom end 15 and an opposite opening 17. The bag of the present disclosure in the embodiment shown is formed from a front wall 5 with an inner and an outer side and a rear wall 3, also with an inner and an outer side. The front wall 5 and the rear wall 3 are connected to each other along their side edges 7, 7' that lie opposite each other, and along their bottom edges. The opening edge 16 of the front wall 5 lies below the opening edge 16' of the rear wall 3. As a result, an overlapping, foldable closing flap 9 is created. In the embodiment shown, this is a single-part component of the rear wall 3. In the shipping bag shown in FIG. 1, the closing flap 9 has a first adhesive strip 11 on the inner side. This extends along the opening edge 16' of the rear wall 3. The front and rear wall 5 and 3 of the shipping bag according to FIG. 1 are made of a flexible plastic material, for example a single- or multi-layer polyethylene foil. Here, the shipping bag, aside from the adhesive strip, can also be produced as a single part from a single plastic material layer.

Due to the flexible material properties, the closing flap 9 can easily be folded over along the opening edge 16 of the front wall 5 onto the outer side of the front wall 5 and hereby forms the overlapping area 19 together with the corresponding section of the front wall. For easier handling, the first adhesive strip 11 is regularly equipped with a protective foil 23' as shown in FIG. 1, which can be removed shortly before use. Through the folding over of the closing flap 9 along the opening edge 16 onto the overlapping area 19, a first closure of the bag opening 17 occurs. Alternatively or in addition, the front wall 5 has a second adhesive strip 31 on the outer side in the overlapping area 19 with the closing area folded over along the opening edge 16 of the front wall 5. In some cases, the second adhesive strip 31 is equipped with a protective foil 25. Furthermore, the shipping bag 1 of the present disclosure is equipped on the outer side of the front wall 5 on the other side of the overlapping area 19, i.e., in the direction of the bottom end 15, with a third adhesive strip 21. This third adhesive strip 21 extends, like the first adhesive strip 11, from the first side edge 7 to the opposite side edge 7', essentially parallel to the first adhesive strip 11. In one embodiment, the third adhesive strip 21 is also initially equipped with a protective foil 23 as shown in FIG. 1. The shipping bag that is closed as described above is then, in some cases, rolled in or folded over in the direction of the third adhesive strip 21 several times, until the third adhesive strip 21 is reached. There, this folded-over section is connected via its entire extension to the third adhesive strip 21 via adhesion.

Figure 2:
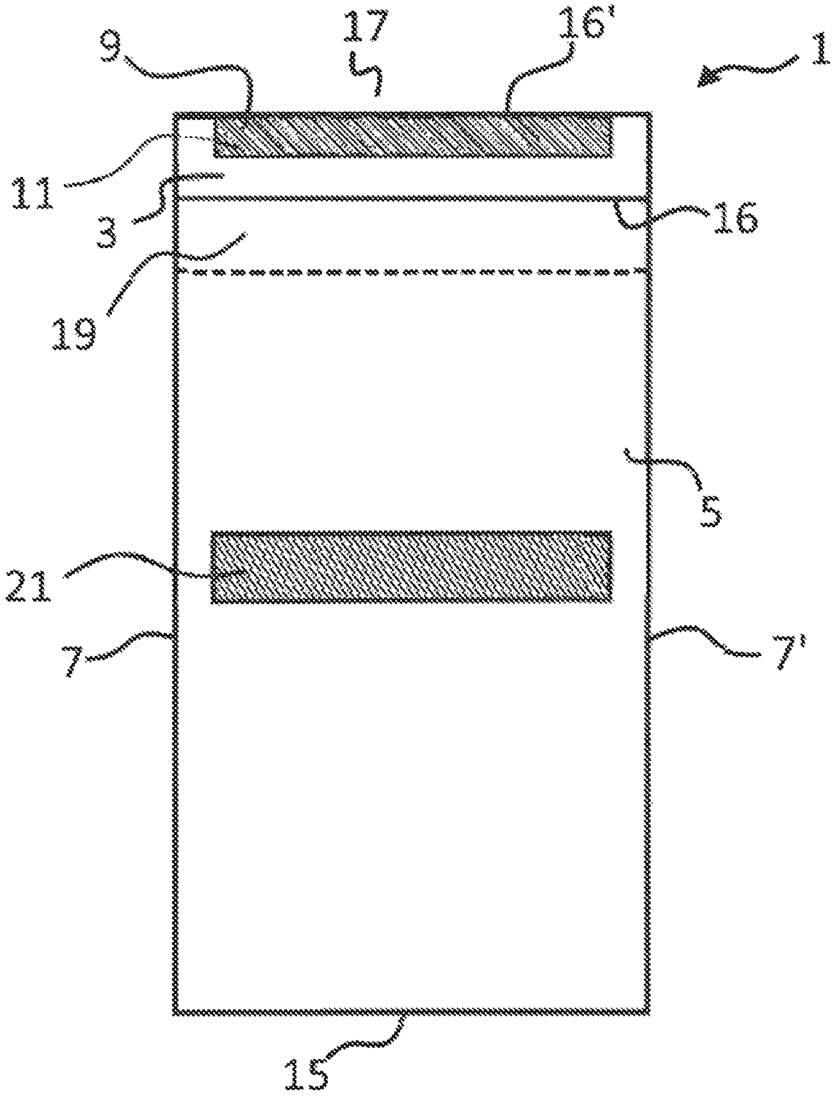
FIG. 2 is a schematic top view of another embodiment of a shipping bag according to the present disclosure.

In the embodiment shown in FIG. 2, the first and third adhesive strips 11, 21 respectively extend not entirely through to the side edges 7, 7' that lie opposite each other, but at a distance from these edges. As a result, the protective foils 23' and 23 that extend through to the opposite side edges can be easily grasped and removed.

According to FIG. 1 and FIG. 2, the used coffee capsules that previously have been collected in the shipping bag are, in the shipping bags of the present disclosure, located in the section between the third adhesive strip 21 and the bottom end 15. It was surprisingly found that with the shipping bag of the present disclosure described above, transportation and shipping is possible that provides greater protection against leakage of damp material.

In an advantageous embodiment, the shipping bags of the present disclosure already have all the necessary address details and other information for shipping on the front and/or rear side, and if appropriate also sufficient stamps, in order to transport them to a collecting point after they are left by the user. Alternatively, it is possible to decentrally collect the shipping bags of the present disclosure, that have been filled with used coffee capsules and closed, for example, in drug stores, supermarkets, or pharmacies, and from there to take them to the recycling depot. In other words, in one advantageous embodiment, the shipping bag of the present disclosure is pre-labeled such that return by the end user cannot go wrong.

The features of the present disclosure in the above description, in the claims and in the drawings, can be essential both individually and in any combination required for the realization of the present disclosure in its different embodiments.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A shipping bag, with a closed bottom end and an opposite opening, comprising:

a front wall with an inner and an outer side, and a rear wall with an inner and an outer side, each having side edges and bottom edges that are connected to each other at least in sections directly or via side walls and/or side folds and/or a bottom fold, wherein an opening edge of the front wall is present below an opening edge of the rear wall, so that the rear wall forms a protruding, fold-over closing area;

wherein the closing area has an adhesive agent A on the inner side or on the outer side of the rear wall, or the front wall has an adhesive agent A' on the outer side in an overlapping area that overlaps with the closing area of the rear wall when the closing area is folded over along the opening edge of the front wall to form a folded and closed closing area;

wherein the front wall has an adhesive agent B on the outer side of the front wall, beyond the overlapping area of the front wall;

wherein:

the adhesive agent A or A' extends from one of the side edges to an opposite side edge, and the adhesive agent B also extends from one of the side edges to an opposite side edge, or the adhesive agent A or A' ends at a distance from one side edge and/or at a distance from an opposite side edge, and the adhesive agent B ends at a distance from one side edge and/or at a distance from an opposite side edge;

wherein the adhesive agent B is present at a distance on the outer side of the front wall beyond the overlapping area, wherein the folded and closed closing area, when formed, is further foldable at least three or four times before this folded-over folded and closed closing area comes into contact with and can be adhered or is adhered with the adhesive agent B in a liquid-tight manner, and be adhesively bonded in a liquid-tight manner;

wherein the folded-over folded and closed closing area forms a closing flap; and wherein the front wall and the rear wall, or the front wall and the rear wall and the side walls, of the shipping bag are comprised of polyethylene and/or polyesters, wherein the front wall and the rear wall are multi-layered, wherein the front wall has a first outer layer consisting of or comprising at least one polymer material, and an opposite first inner layer consisting of or comprising at least one polymer material, and wherein the rear wall has a second outer layer consisting of or comprising at least one polymer material, and an opposite second inner layer consisting of or comprising at least one polymer material, wherein the front wall and the rear wall have at least three layers, wherein the at least three layers of the front wall and the at least three layers of the rear wall comprise an inner layer, an interim layer, and an outer layer, wherein the interim layer has a plurality of strip-shaped longitudinal areas that are piled or folded, and that run at a distance from each other, and wherein the interim layer is connected to the inner layer and the outer layer by way of weld seams that run transverse to the piled or folded strip-shaped longitudinal areas.

2. The shipping bag of claim 1, wherein the adhesive agent A and/or the adhesive agent A' and/or the adhesive agent B are adhesive strips.

3. The shipping bag of claim 1, wherein the adhesive agent A and/or the adhesive agent A' run parallel to the opening edge of the front wall and/or of the rear wall of the shipping bag, and/or wherein the adhesive agent B runs essentially parallel to the opening edge of the front wall and/or of the rear wall of the shipping bag.

4. The shipping bag of claim 3, wherein the adhesive agent B is present in a section on the outer side of the front wall beyond the overlapping area and on the same side of a lower third of the shipping bag.

5. The shipping bag of claim 4, wherein the adhesive agent B is present in a section on the outer side of the front wall beyond the overlapping area and on the same side of a half of the front wall.

6. The shipping bag according to claim 1, further comprising first and/or second side wall elements between opposite side edges of the front and rear wall, and/or a bottom fold between the bottom edges of the front and rear wall.

7. The shipping bag of claim 1, wherein a longitudinal length of the rear wall measured from the bottom end to the opening end of the rear wall is greater than a longitudinal length of the front wall measured from the bottom end to the opening end of the front wall.

8. The shipping bag of claim 1, wherein at least one of the adhesive agents A, A', or B comprises at least one detachable protective foil, wherein the protective foil prevents a connection between the front wall and the rear wall.

9. The shipping bag of claim 6, wherein the side walls are multi-layered and/or comprise a bubble wrap foil.

10. The shipping bag of claim 1, wherein the polymer material is polyethylene.

11. A method for collecting damp waste comprising the steps of:

a) providing a shipping bag according to claim 1;

b) filling the shipping bag with damp waste via the bag opening;

c) folding over the fold-over closing area onto the outer side of the front wall;

d) adhering the fold-over closing area to the outer side of the front wall using the adhesive agent A and/or the adhesive agent A' to form an adhered fold-over closing area;

e) multiple folding-over or rolling in of the adhered fold-over closing area until at least the adhesive agent B is reached; and f) adhering the adhered fold-over closing area that has been folded over multiple times or rolled in with the adhesive agent B.

12. The method of claim 11, wherein the fold-over closing area is folded over at the height of the opening edge of the front wall onto the outer side of the front wall; and then adhered to the outer side of the front wall using the adhesive agent A and/or the adhesive agent A'.

13. The method of claim 11, wherein in order to adhere the adhered fold-over closing area that has been folded over multiple times or rolled in with the adhesive agent B, this adhesive agent B extends from one side edge of the front wall to an opposite side edge of the front wall, or ends at a distance from the one side edge and/or from the opposite side edge.

14. The method of claim 11, wherein the damp waste is located in a non-folded-over or rolled-in section of the shipping bag.

15. The method of claim 11, wherein the shipping bag adhered according to step f) is shipped to a collecting point for shipping bags that have been filled and closed according to the method of claim 11.

16. A method for recycling used coffee capsules, comprising:

i) collecting a plurality of shipping bags filled with used aluminum coffee capsules according to the method of claim 11, ii) subjecting the plurality of collected shipping bags containing used aluminum coffee capsules to a melting process, iii) isolating the molten aluminum, and iv) solidifying the isolated, molten aluminum.

17. Use of the shipping bag of claim 1 for collecting damp waste or used aluminum coffee capsules, and/or for shipping used aluminum coffee capsules, to a collecting point for this damp waste and/or used aluminum coffee capsules.

* * * * *